(12) United States Patent
Sakamoto et al.

(10) Patent No.: US 11,015,518 B2
(45) Date of Patent: May 25, 2021

(54) VARIABLE NOZZLE DEVICE AND VARIABLE-GEOMETRY TYPE EXHAUST TURBOCHARGER

(71) Applicants: MITSUBISHI HEAVY INDUSTRIES, LTD., Tokyo (JP); MITSUBISHI HEAVY INDUSTRIES ENGINE & TURBOCHARGER, LTD., Sagamihara (JP)

(72) Inventors: Keigo Sakamoto, Tokyo (JP); Shigeyoshi Sakuma, Tokyo (JP); Eigo Katou, Tokyo (JP); Yosuke Dammoto, Sagamihara (JP); Yoji Akiyama, Sagamihara (JP); Nariaki Seike, Sagamihara (JP); Hiroyuki Arimizu, Sagamihara (JP)

(73) Assignees: MITSUBISHI HEAVY INDUSTRIES, LTD., Tokyo (JP); MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 218 days.

(21) Appl. No.: 16/326,633

(22) PCT Filed: Mar. 16, 2017

(86) PCT No.: PCT/JP2017/010768
§ 371 (c)(1),
(2) Date: Feb. 19, 2019

(87) PCT Pub. No.: WO2018/167931
PCT Pub. Date: Sep. 20, 2018

(65) Prior Publication Data
US 2020/0408142 A1    Dec. 31, 2020

(51) Int. Cl.
*F02B 37/24* (2006.01)
*F01D 17/16* (2006.01)

(52) U.S. Cl.
CPC ............ *F02B 37/24* (2013.01); *F01D 17/165* (2013.01); *F05D 2220/40* (2013.01); *F05D 2240/128* (2013.01)

(58) Field of Classification Search
CPC .... F02B 37/24; F01D 17/165; F05D 2220/40; F05D 2240/128
(Continued)

(56) References Cited

U.S. PATENT DOCUMENTS

2011/0236197 A1    9/2011  Burmeister et al.
2011/0296829 A1*  12/2011  Hayashi .................. F02B 37/24
                                                                   60/602
(Continued)

FOREIGN PATENT DOCUMENTS

CN        104471207 A     3/2015
DE    102007040679 A1     3/2009
(Continued)

OTHER PUBLICATIONS

Office Action issued to the corresponding European Application No. 17 900 554.1 dated Mar. 18, 2020.
(Continued)

*Primary Examiner* — J. Todd Newton
(74) *Attorney, Agent, or Firm* — Birch, Stewart, Kolasch & Birch, LLP (57) ABSTRACT

A variable nozzle device includes: a first plate-shaped member having a first plate portion having an annular shape and being fixed to a bearing housing; a second plate-shaped member having a second plate portion which has an annular shape and which defines a nozzle flow passage between the first plate portion and the second plate portion, the second
(Continued)

plate portion having a surface disposed so as to face the first plate portion and another surface disposed so as to face at least partially a scroll flow passage formed inside a turbine housing; at least one nozzle support having, with respect to an axial direction of the nozzle support, an end coupled to the first plate portion and another end coupled to the second plate portion; at least one nozzle vane rotatably supported between the first plate portion and the second plate portion; and a variable nozzle mechanism configured to change a vane angle of the at least one nozzle vane. The second plate portion is formed to have a larger thickness than the first plate portion.

6 Claims, 8 Drawing Sheets

(58) Field of Classification Search
USPC .......................................................... 415/159
See application file for complete search history.

(56) References Cited

U.S. PATENT DOCUMENTS

| | | | |
|---|---|---|---|
| 2015/0125275 A1* | 5/2015 | Ueda | F02B 37/24 415/158 |
| 2015/0211538 A1 | 7/2015 | Aiba et al. | |
| 2019/0249563 A1* | 8/2019 | Motoda | F01D 17/16 |

FOREIGN PATENT DOCUMENTS

| | | |
|---|---|---|
| DE | 102008000860 A1 | 10/2009 |
| JP | 63-61545 U | 4/1988 |
| JP | 11-336554 A | 12/1999 |
| JP | 2012-62808 A | 3/2012 |
| JP | 2014-34910 A | 2/2014 |
| JP | 2014-152629 A | 8/2014 |
| WO | WO 2010/097980 A1 | 9/2010 |
| WO | WO 2010/137609 A1 | 12/2010 |

OTHER PUBLICATIONS

Extended European Search Report dated Jun. 28, 2019, for European Application No. 17900554.1.
Office Action dated Jun. 3, 2020 issued in counterpart Chinese Application No. 201780050474.9 with English Translation.
International Search Report, issued in PCT/JP2017/010768, PCT/ISA/210, dated Jun. 13, 2017.
Written Opinion of the International Searching Authority, issued in PCT/JP2017/010768, PCT/ISA/237, dated Jun. 13, 2017.

* cited by examiner

|         | D3/D2 | D1/D2 | H/L  |
|---------|-------|-------|------|
| SAMPLE31 | 0.83  | 0.67  | 0.06 |
| SAMPLE32 | 0.92  | 0.67  | 0.13 |
| SAMPLE33 | 0.82  | 0.64  | 0.19 |
| SAMPLE34 | 0.70  | 0.60  | 0.26 |
| SAMPLE35 | 0.67  | 0.67  | 0.32 |

FIG. 9

VARIABLE NOZZLE DEVICE AND VARIABLE-GEOMETRY TYPE EXHAUST TURBOCHARGER

TECHNICAL FIELD

The present disclosure relates to a variable nozzle device and a variable-geometry type exhaust turbocharger including the variable nozzle device.

BACKGROUND ART

An exhaust turbocharger utilizes energy of exhaust gas discharged from an engine to supercharge air supplied to the engine. A typical type of exhaust turbocharger is a variable-geometry type exhaust turbocharger which includes a variable nozzle device, which is used for an automobile diesel engine, for instance (see Patent Documents 1 and 2).

A variable-geometry type exhaust turbocharger includes a turbine housing, a bearing housing, and a variable nozzle device mounted inside the turbine housing and the bearing housing assembled together. In a variable-geometry type exhaust turbocharger, energy of exhaust gas discharged from an engine serves as power that rotates a turbine rotor disposed rotatably at the center of the turbine housing, and air supplied to the engine is supercharged utilizing rotation of the turbine rotor. Herein, the above described exhaust gas passes through a scroll flow passage which is a scroll-shaped flow passage of exhaust gas formed inside the turbine housing, and then passes through a nozzle flow passage which is a flow passage of exhaust gas defined by the variable nozzle device, before being supplied to the turbine rotor.

The variable nozzle device includes a nozzle mount and a nozzle plate supported by nozzle supports at a distance from one another, and the space formed between the nozzle mount and the nozzle plate is the above described nozzle flow passage. Further, the variable nozzle device includes a plurality of nozzle vanes rotatably supported between the nozzle mount and the nozzle plate, and the variable nozzle device is capable of changing the vane angle of the nozzle vanes. Furthermore, the variable nozzle device is capable of increasing and decreasing the flow-passage area of exhaust gas supplied to the turbine rotor by changing the vane angle of the nozzle vanes. Accordingly, it is possible to adjust the flow velocity of exhaust gas supplied to the turbine rotor and the supply amount to the turbine rotor, to adjust the boost pressure of air supplied to the engine.

Furthermore, the nozzle support of a typical variable nozzle device is formed to have a cylindrical shape at the body portion positioned between the nozzle mount and the nozzle plate, like the nozzle support in Patent Document 2 (see FIG. 3 of Patent Document 2).

CITATION LIST

Patent Literature

Patent Document 1: JP2014-152629A
Patent Document 2: JP2014-34910A

SUMMARY

Problems to be Solved

However, in a typical variable-geometry type exhaust turbocharger, the temperature of exhaust gas discharged from a diesel engine may get as high as about 850° C. In this case, thermal deformation may occur at various parts of the variable nozzle device such as the nozzle mount, the nozzle plate, and the nozzle support, which may cause performance deterioration and malfunction of the variable nozzle device. Furthermore, in a case where a variable-geometry type exhaust turbocharger including a variable nozzle device is applied to a gasoline engine, the temperature of exhaust gas discharged from the gasoline engine may get as high as about 950° C. In this case, thermal deformation may occur at various parts of the variable nozzle device, which increases the risk of performance deterioration and malfunction of the variable nozzle device even further.

In view of the above, an object of at least one embodiment of the present invention is to provide a variable nozzle device and a variable-geometry type exhaust turbocharger including the variable nozzle device, capable of preventing performance deterioration and malfunction of the variable nozzle device due to thermal deformation of various parts used in the variable nozzle device under a high temperature.

Solution to the Problems (1) According to at least one embodiment of the present invention, a variable nozzle device includes; a first plate-shaped member having a first plate portion having an annular shape and being fixed to a bearing housing; a second plate-shaped member having a second plate portion which has an annular shape and which defines a nozzle flow passage between the first plate portion and the second plate portion, the second plate portion having a surface disposed so as to face the first plate portion and another surface disposed so as to face at least partially a scroll flow passage formed inside a turbine housing; at least one nozzle support having, with respect to an axial direction of the nozzle support, an end coupled to the first plate portion and another end coupled to the second plate portion; at least one nozzle vane rotatably supported between the first plate portion and the second plate portion; and a variable nozzle mechanism configured to change a vane angle of the at least one nozzle vane. The second plate portion is formed to have a larger thickness than the first plate portion.

With the above configuration (1), the second plate-shaped member is configured such that a surface of the second plate portion facing the first plate portion of the first plate-shaped member makes contact with high-temperature exhaust gas passing through the nozzle flow passage, and at least a part of the other surface of the second plate portion makes contact with high-temperature exhaust gas passing through the scroll flow passage formed inside the turbine housing. By forming the second plate portion of the second plate-shaped member to have a larger thickness than the first plate portion of the first plate-shaped member, it is possible to increase the heat capacity of the second plate portion, and increase the strength of the second plate portion. Further, with the second plate portion having a high heat capacity and a high strength, it is possible to prevent wavy deformation of the second plate portion, and reduce the amount of thermal deformation of the second plate portion due to exhaust gas. By reducing the amount of thermal deformation of the second plate portion due to exhaust gas, it is possible to reduce the shearing force and the bending moment applied to the nozzle support coupled to the second plate portion. Accordingly, it is possible to prevent damage to the second plate-shaped member and the nozzle support, and prevent performance deterioration and malfunction of the variable nozzle device. Furthermore, it is possible to use stainless steel to form parts of the variable nozzle device such as the first plate-shaped member and the second plate-shaped member, instead of an expensive heat-resistant alloy. Thus, it is possible to reduce the costs to produce the variable nozzle device.

Thus, with the above configuration, it is possible to prevent performance deterioration and malfunction of the variable nozzle device due to thermal deformation of various parts used in the variable nozzle device under a high temperature.

(2) In some embodiments, in the above configuration (1), a thickness dimension ratio T1/T2 is 1.3-1.8, where T1 is a thickness dimension of the second plate portion and T2 is a thickness dimension of the first plate portion.

With the above configuration (2), the thickness-dimension ratio T1/T2 is 1.3-1.8, where T1 is the thickness dimension of the second plate portion and T2 is the thickness dimension of the first plate portion. Herein, if the thickness-dimension ratio T1/T2 of the second plate portion to the first plate portion is smaller than 1.3, it may be difficult to reduce the amount of thermal deformation of the second plate portion under a high temperature, because the second plate portion has a small thickness. Further, if the thickness-dimension ratio T1/T2 of the second plate portion to the first plate portion is greater than 1.8, it may increase the weight and the price of the second plate-shaped member having the second plate portion, because the second plate portion has a large thickness. In this regard, in a case where the thickness-dimension ratio T1/T2 of the second plate portion to the first plate portion is 1.3-1.8, it is possible to reduce the amount of thermal deformation of the second plate portion under a high temperature, and to prevent an increase in the weight and the price of the second plate-shaped member having the second plate portion.

(3) In some embodiments, in the above configuration (1) or (2), the first plate portion includes a radially inner portion supporting the nozzle vane and a radially outer portion positioned on a radially outer side of the radially inner portion. The radially inner portion is formed to have a larger thickness than the radially outer portion. The second plate portion is formed to have a larger thickness than the radially inner portion of the first plate portion.

With the above configuration (3), by forming the second plate portion of the second plate-shaped member to have a larger thickness than the radially inner portion of the first plate portion of the first plate-shaped member, it is possible to increase the heat capacity of the second plate portion, and increase the strength of the second plate portion.

(4) According to at least one embodiment of the present invention, a variable nozzle device includes: a first plate-shaped member having a first plate portion having an annular shape and being fixed to a bearing housing; a second plate-shaped member having a second plate portion which has an annular shape and which defines a nozzle flow passage between the first plate portion and the second plate portion, the second plate portion having a surface disposed so as to face the first plate portion and another surface disposed so as to face at least partially a scroll flow passage formed inside a turbine housing; at least one nozzle support having, with respect to an axial direction of the nozzle support, an end coupled to the first plate portion and another end coupled to the second plate portion; at least one nozzle vane rotatably supported between the first plate portion and the second plate portion; and a variable nozzle mechanism configured to change a vane angle of the at least one nozzle vane. The nozzle support includes a body portion positioned between the first plate-shaped member and the second plate-shaped member, the body portion having a small diameter portion which is formed in a center part with respect to the axial direction and which has a smaller shaft diameter than both end portions of the body portion.

With the above configuration (4), the nozzle support includes a body portion positioned between the first plate-shaped member and the second plate-shaped member, the body portion having a small diameter portion which is formed in a center part with respect to the axial direction and which has a smaller shaft diameter than both end portions of the body portion. That is, the body portion of the nozzle support includes a small-diameter portion at the center part, and includes large-diameter portions having a greater diameter than the small-diameter portion at both end portions. Further, with the body portion of the nozzle support having the large-diameter portions at both end portions, it is possible to prevent reduction of the bend strength of the nozzle support. Furthermore, with the body portion of the nozzle support having the small-diameter portion at the center part, it is possible to reduce the heat capacity of the nozzle support, and raise the temperature-increase speed of the nozzle support under a high temperature. Furthermore, by raising the temperature-increase speed of the nozzle support under a high temperature, it is possible to reduce the difference in the amount of thermal expansion between the nozzle support and the nozzle vane at the time of excessive heating, and thereby prevent malfunction of the variable nozzle device due to a narrowed gap between the nozzle vane and the second plate-shaped member, or contact between the nozzle vane and the second plate-shaped member.

Thus, with the above configuration, it is possible to prevent performance deterioration and malfunction of the variable nozzle device due to thermal deformation of various parts used in the variable nozzle device under a high temperature.

(5) In some embodiments, in any one of the above configurations (1) to (3), the nozzle support includes a body portion positioned between the first plate-shaped member and the second plate-shaped member, the body portion having a small diameter portion which is formed in a center part with respect to the axial direction and which has a smaller shaft diameter than both end portions of the body portion.

With the above configuration (5), the nozzle support includes a body portion positioned between the first plate-shaped member and the second plate-shaped member, the body portion having a small diameter portion which is formed in a center part with respect to the axial direction and which has a smaller shaft diameter than both end portions of the body portion. That is, the body portion of the nozzle support includes a small-diameter portion at the center part, and includes large-diameter portions having a greater diameter than the small-diameter portion at both end portions. Further, with the body portion of the nozzle support having the large-diameter portions at both end portions, it is possible to prevent reduction of the bend strength of the nozzle support. Furthermore, with the body portion of the nozzle support having the small-diameter portion at the center part, it is possible to reduce the heat capacity of the nozzle support, and raise the temperature-increase speed of the nozzle support under a high temperature. Furthermore, by raising the temperature-increase speed of the nozzle support under a high temperature, it is possible to reduce the difference in the amount of thermal expansion between the nozzle support and the nozzle vane at the time of excessive heating, and thereby prevent malfunction of the variable nozzle device due to a narrowed gap between the nozzle vane and the second plate-shaped member, or contact between the nozzle vane and the second plate-shaped member.

(6) In some embodiments, in the above configuration (4) or (5), the small diameter portion is formed to have a shaft diameter that increases from a side of the center part towards sides of both end portions in the axial direction.

With the above configuration (6), the small-diameter portion is formed to have a shaft diameter which increases from the center toward both end portions with respect to the axial direction. Thus, it is possible to prevent a decrease in the bend strength of the nozzle support and reduce the shaft diameter of the small-diameter portion of the nozzle support, compared to a case where the center part with respect to the axial direction is formed to have a cylindrical shape. Thus, it is possible to further reduce the heat capacity of the nozzle support.

(7) In some embodiments, in any one of the above configurations (4) to (6), the nozzle support includes a second plate-shaped member side large diameter portion disposed continuously from the small diameter portion at a side of the second plate-shaped member, and formed to have a larger diameter than a second plate-shaped member side coupling portion coupled to the second plate-shaped member. A shaft diameter ratio D3/D2 is 0.6-0.9, where D3 is a minimum diameter of the small diameter portion and D2 is a diameter of the second plate-shaped member side large diameter portion.

Herein, with the above configuration (7), the nozzle support is configured such that the shaft diameter ratio D3/D2 is 0.6-0.9, where D3 is the minimum diameter of the small-diameter portion and D2 is the diameter of the large-diameter portion of the second plate-shaped member. Herein, in a case where the shaft diameter ratio D3/D2 of the nozzle support is smaller than 0.6, it may be difficult to prevent reduction of the bend strength of the nozzle support. Furthermore, in a case where the shaft diameter ratio D3/D2 of the nozzle support is larger than 0.9, it may be difficult to reduce the heat capacity of the nozzle support so as to raise the temperature increase speed of the nozzle support under a high temperature. In this regard, in a case where the shaft diameter ratio D3/D2 of the nozzle support is 0.6-0.9, it is possible to reduce the heat capacity of the nozzle support while preventing a decrease in the bend strength of the nozzle support.

(8) In some embodiments, in the above configuration (7), the nozzle support includes a first plate-shaped member side large diameter portion disposed continuously from the small diameter portion at a side of the first plate-shaped member, and formed to have a larger diameter than a first plate-shaped member side coupling portion coupled to the first plate-shaped member. A length dimension ratio H/L is 0.1-0.3, where H is a length dimension of the second plate-shaped member side large diameter portion in the axial direction and L is a total length dimension of the first plate-shaped member side large diameter portion, the second plate-shaped member side large diameter portion, and the small diameter portion in the axial direction. A shaft diameter ratio D1/D2 is 0.6-0.8, where D1 is a diameter of the second plate-shaped member side coupling portion.

With the above configuration (8), the nozzle support is configured such that the length dimension ratio H/L is 0.1-0.3, where H is a length dimension of the second plate-shaped member side large diameter portion in the axial direction and L is a total length dimension of the first plate-shaped member side large diameter portion, the second plate-shaped member side large diameter portion, and the small diameter portion in the axial direction. Herein, in a case where the length dimension ratio H/L of the nozzle support is smaller than 0.1, it may be difficult to prevent reduction of the bend strength of the nozzle support. Furthermore, in a case where the length dimension ratio H/L of the nozzle support is larger than 0.3, it may be difficult to reduce the heat capacity of the nozzle support so as to raise the temperature increase speed of the nozzle support under a high temperature. In this regard, in a case where the length dimension ratio H/L of the nozzle support is 0.1-0.3, it is possible to reduce the heat capacity of the nozzle support while preventing a decrease in the bend strength of the nozzle support.

Herein, the nozzle support is configured such that the shaft diameter ratio D1/D2 is 0.6-0.8, where D1 is the diameter of the second plate-shaped member side coupling portion and D2 is the diameter of the second plate-shaped member side large diameter portion. Herein, in a case where the shaft diameter ratio D1/D2 of the nozzle support is smaller than 0.6, it may be difficult to reduce the heat capacity of the nozzle support so as to raise the temperature increase speed of the nozzle support under a high temperature. Furthermore, in a case where the shaft diameter ratio D1/D2 of the nozzle support is larger than 0.8, it may be difficult to prevent reduction of the bend strength of the nozzle support. In this regard, in a case where the shaft diameter ratio D1/D2 of the nozzle support is 0.6-0.8, it is possible to reduce the heat capacity of the nozzle support while preventing a decrease in the bend strength of the nozzle support.

(9) According to at least one embodiment of the present invention, a variable-geometry type exhaust turbocharger includes the variable nozzle device according to any one of the above (1) to (8).

With the above configuration (9), the variable-geometry type exhaust turbocharger includes the variable nozzle device having the configuration according to any one of the above (1) to (8), and thus it is possible to prevent performance deterioration and malfunction of the variable nozzle device due to thermal deformation of various parts used in the variable nozzle device under a high temperature. Thus, with the above variable-geometry type exhaust turbocharger, the performance of the variable nozzle device is maintained under a high temperature, and thus it is possible to adjust the boost pressure of air supplied to the engine under a high temperature.

Advantageous Effects

According to at least one embodiment of the present invention, it is possible to provide a variable nozzle device and a variable-geometry type exhaust turbocharger including the variable nozzle device, capable of preventing performance deterioration and malfunction of the variable nozzle device due to thermal deformation of various parts used in the variable nozzle device under a high temperature.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
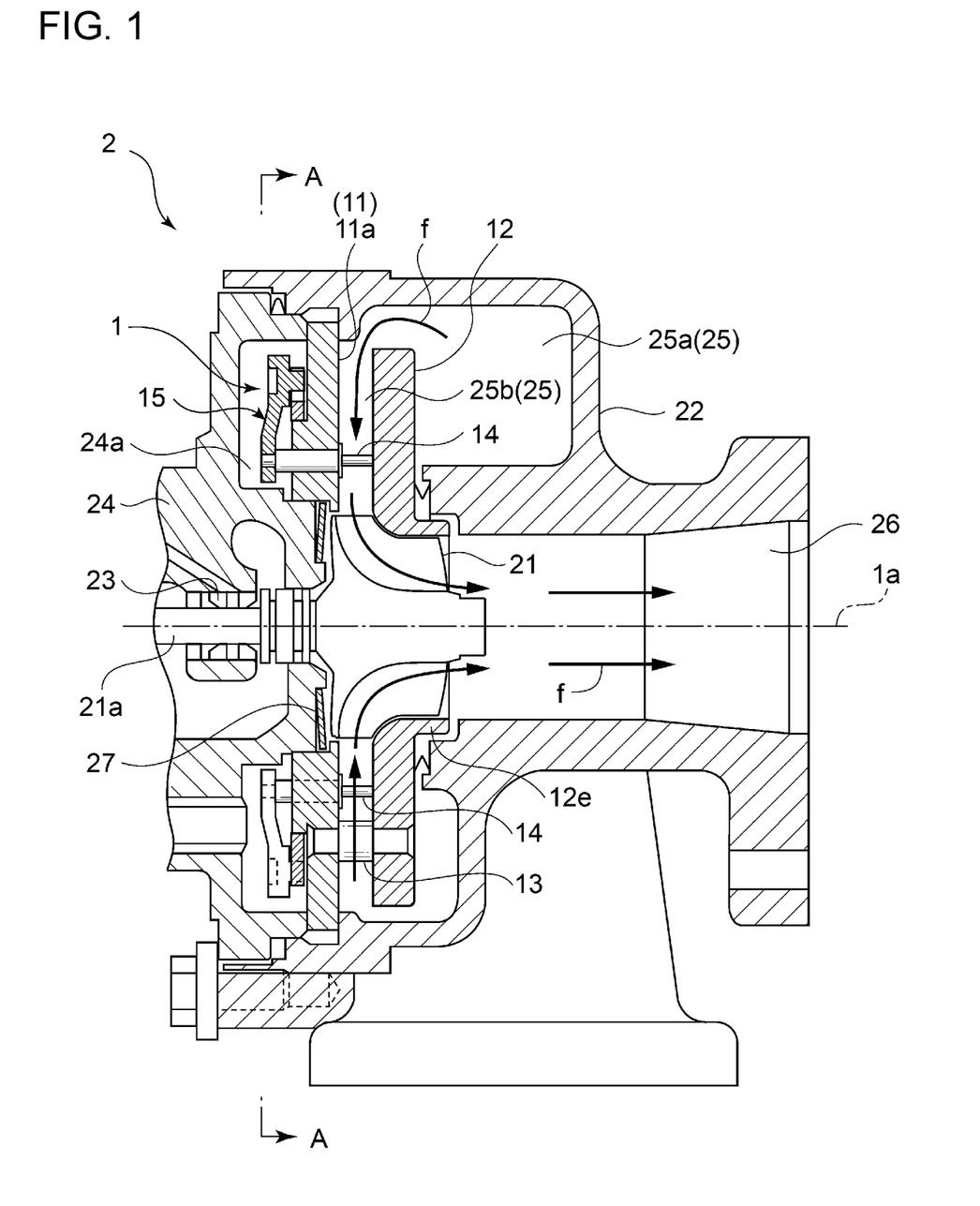
FIG. 1 is a cross-sectional view schematically showing a variable-geometry type exhaust turbocharger including a variable nozzle device according to an embodiment of the present invention.
Figure 2:
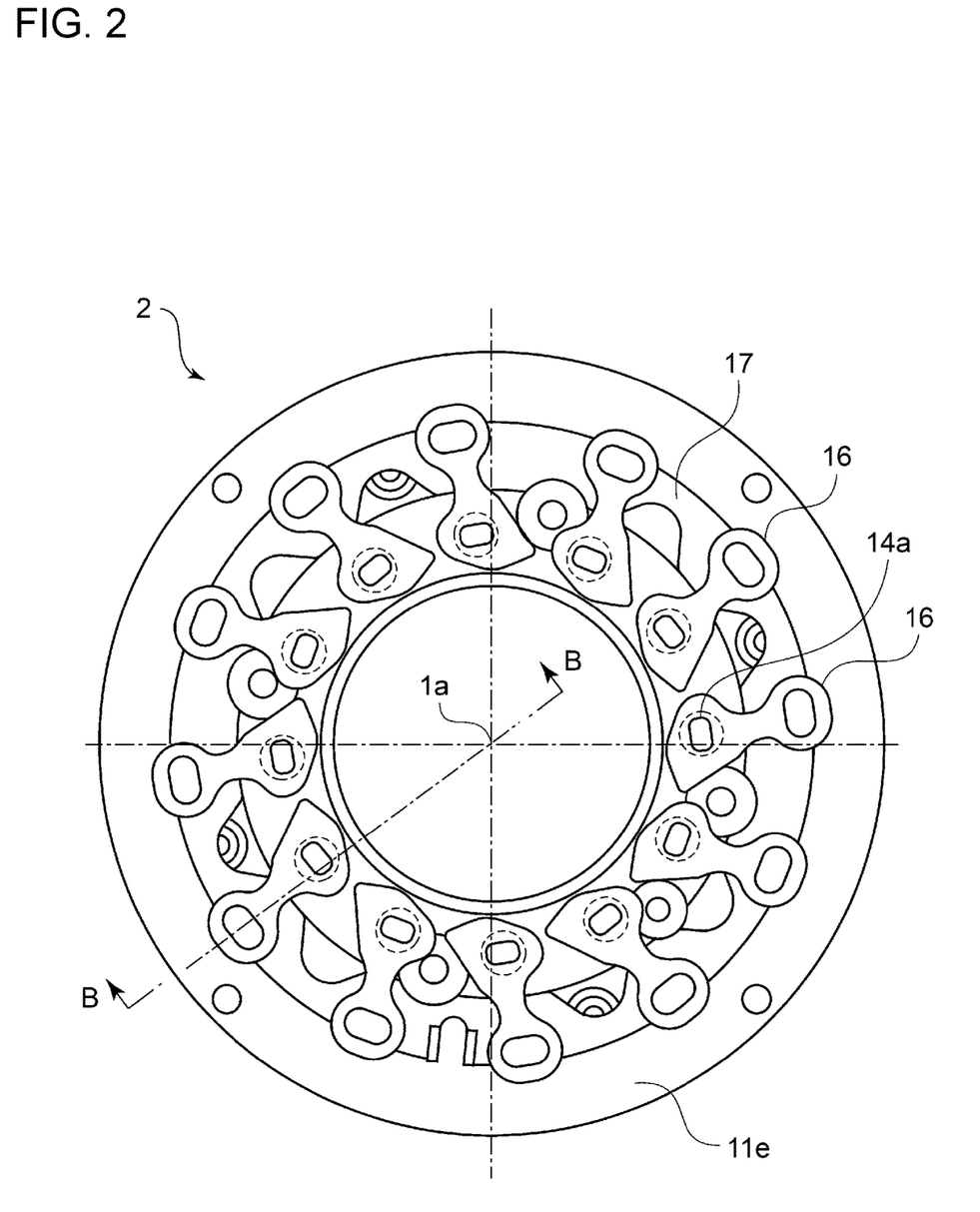
FIG. 2 is a schematic cross-sectional view taken along line A-A in FIG. 1 as seen in the direction of the arrow.
Figure 3:
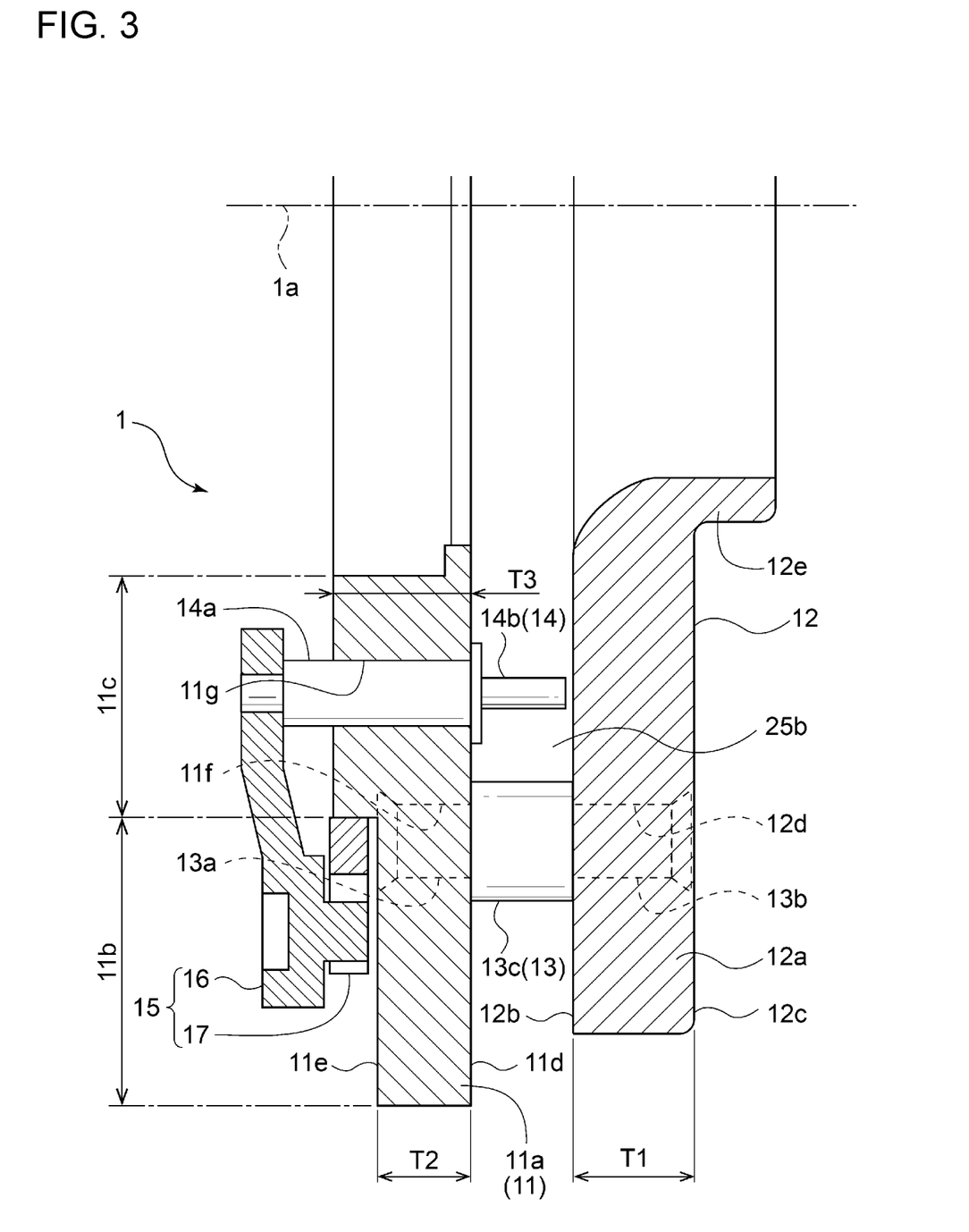
FIG. 3 is a schematic cross-sectional view taken along line B-B in FIG. 2 as seen in the direction of the arrow.
Figure 4:
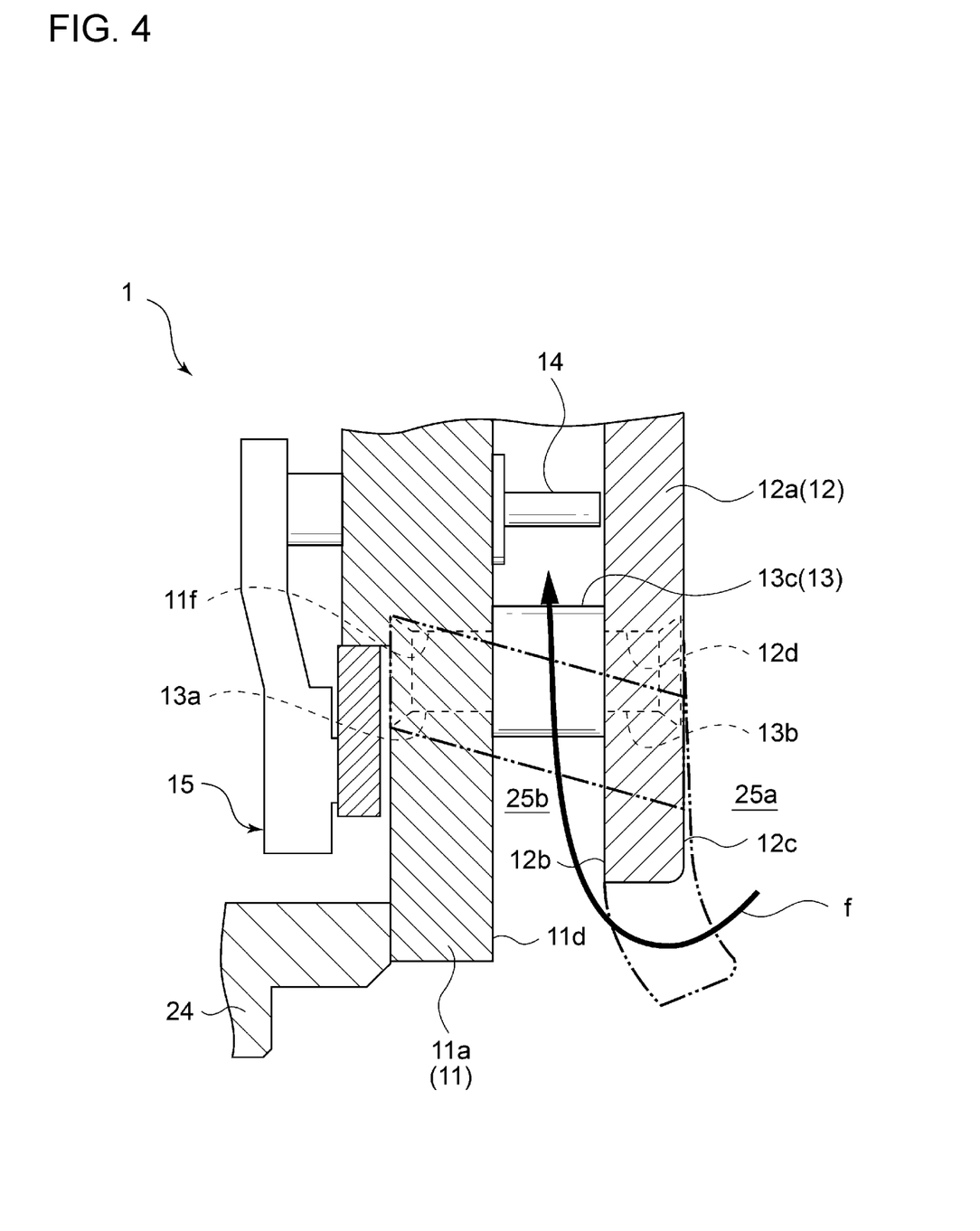
FIG. 4 is an explanatory diagram for explaining a state where the nozzle mount and the nozzle plate are deformed to expand, and a shear force and bending moment are applied to the nozzle support coupling the nozzle mount and the nozzle plate.
Figure 5:
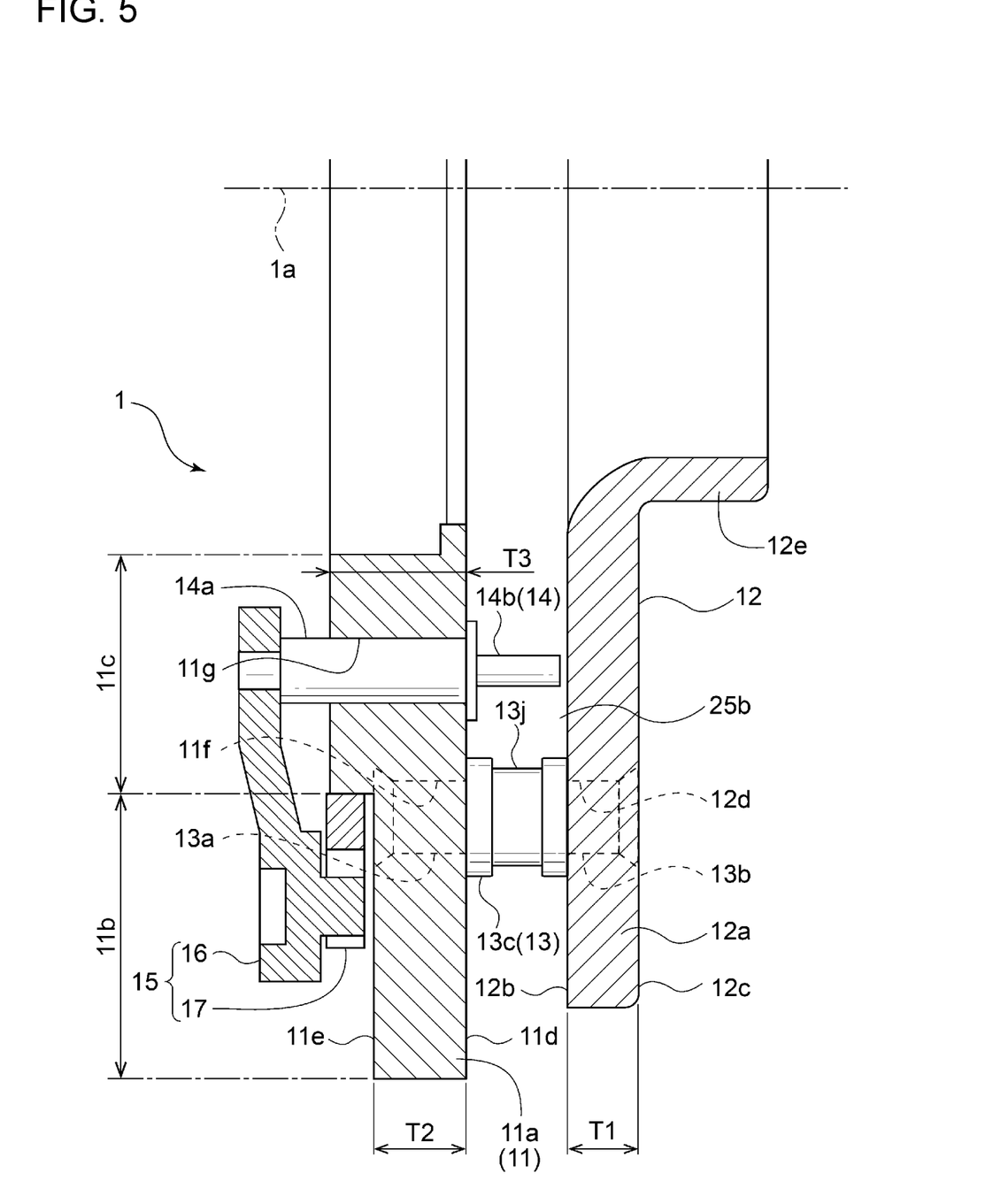
FIG. 5 is a schematic diagram of a variable nozzle device according to another embodiment of the present invention, schematically showing a cross section that corresponds to the arrow directional view of FIG. 2 taken along line B-B.
Figure 6:
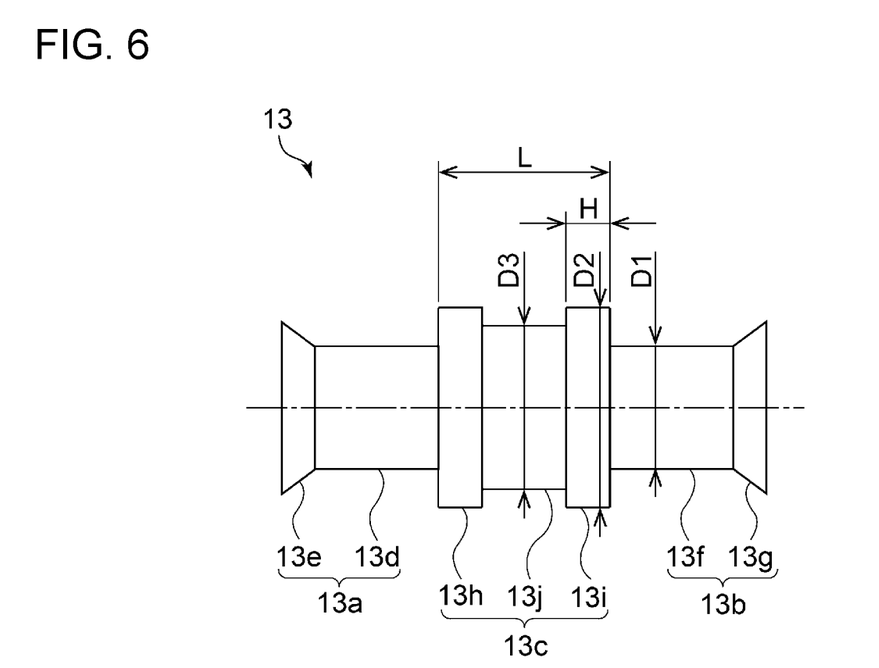
FIG. 6 is a diagram of a nozzle support according to another embodiment of the present invention, showing a front view of a nozzle support including a body portion which has a small diameter portion formed to have a cylindrical shape.
Figure 7:
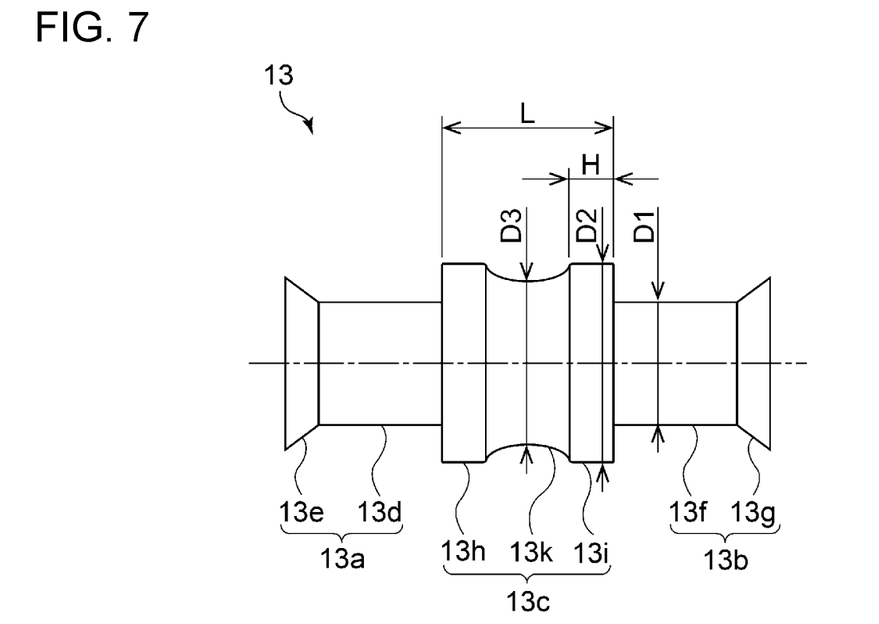
FIG. 7 is a diagram of a nozzle support according to another embodiment of the present invention, showing a front view of a nozzle support including a body portion which has a small diameter portion formed to have a curved narrowed portion.
Figure 8:
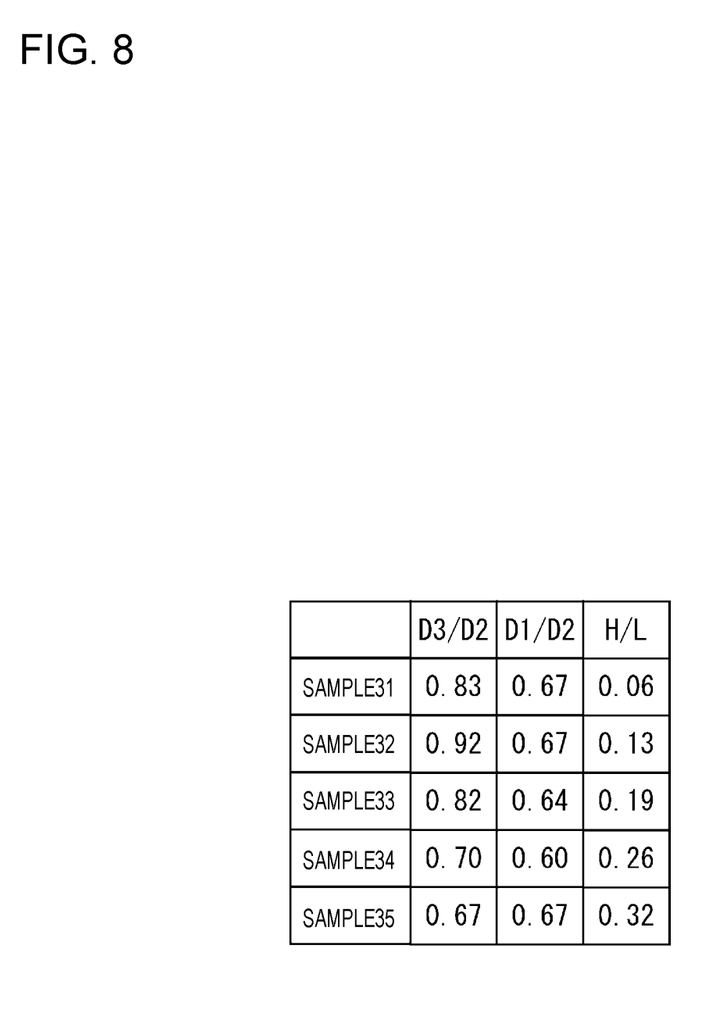
FIG. 8 is a chart illustrating working examples of the nozzle support depicted in FIG. 6 or FIG. 7.
Figure 9:
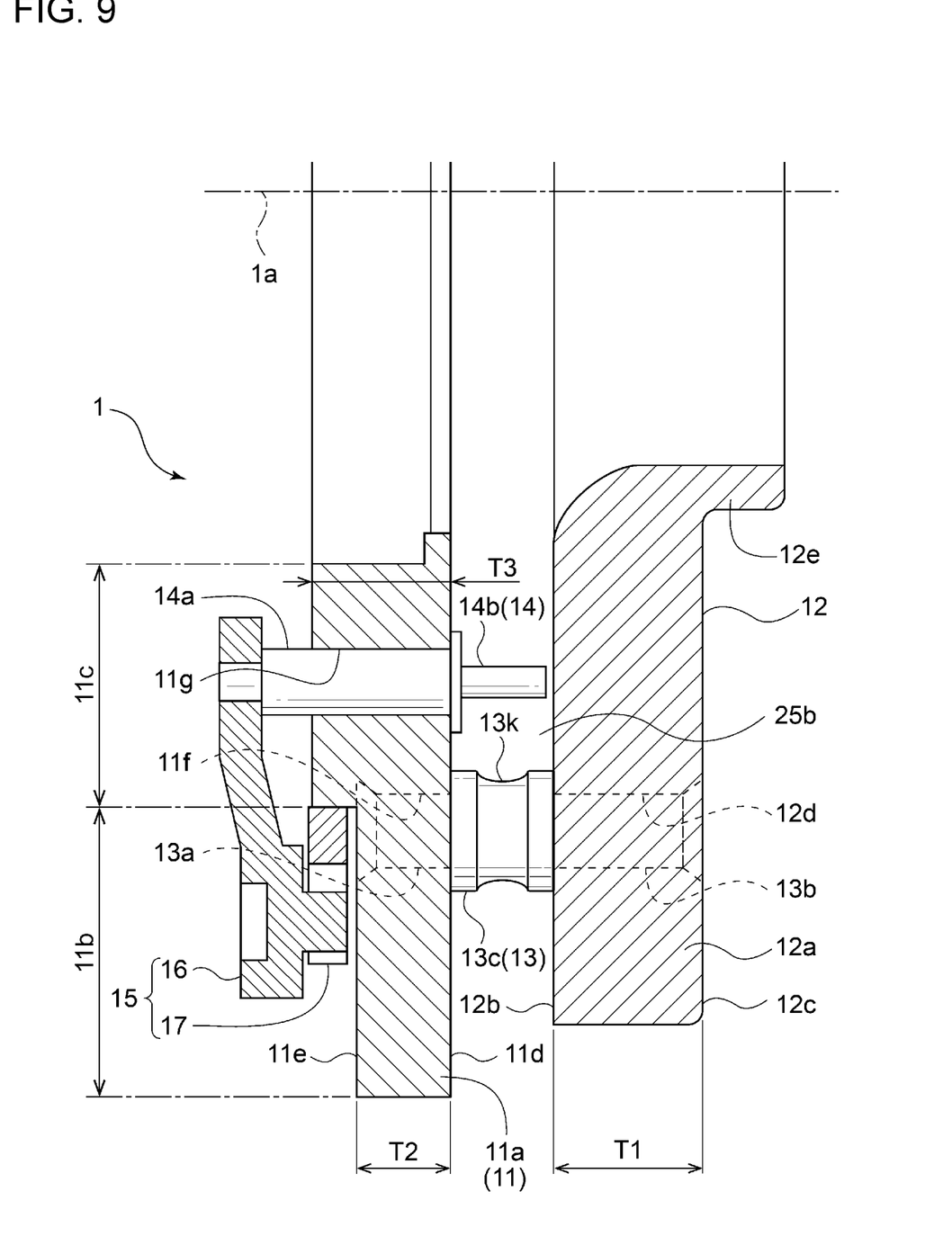
FIG. 9 is a schematic diagram of a variable nozzle device according to yet another embodiment of the nozzle support of the present invention, schematically showing a cross section that corresponds to the arrow directional view of FIG. 2 taken along line B-B.

FIG. 1 is a cross-sectional view schematically showing a variable-geometry type exhaust turbocharger including a variable nozzle device according to an embodiment of the present invention. FIG. 2 is a schematic cross-sectional view taken along line A-A in FIG. 1 as seen in the direction of the arrow. FIG. 3 is a schematic cross-sectional view taken along line B-B in FIG. 2 as seen in the direction of the arrow. FIG. 4 is an explanatory diagram for explaining a state where the nozzle mount and the nozzle plate are deformed to expand, and a shear force and bending moment are applied to the nozzle support coupling the nozzle mount and the nozzle plate. FIG. 5 is a schematic diagram of a variable nozzle device according to another embodiment of the present invention, schematically showing a cross section that corresponds to the arrow directional view of FIG. 2 taken along line B-B. FIG. 6 is a diagram of a nozzle support according to another embodiment of the present invention, showing a front view of a nozzle support including a body portion which has a small diameter portion formed to have a cylindrical shape. FIG. 7 is a diagram of a nozzle support according to another embodiment of the present invention, showing a front view of a nozzle support including a body portion which has a small diameter portion formed to have a curved narrowed portion. FIG. 8 is a chart illustrating working examples of the nozzle support depicted in FIG. 6 or FIG. 7. FIG. 9 is a schematic diagram of a variable nozzle device according to yet another embodiment of the nozzle support of the present invention, schematically showing a cross section that corresponds to the arrow directional view of FIG. 2 taken along line B-B.

Hereinafter, respective configurations of a variable nozzle device 1 and a variable-geometry type exhaust turbocharger 2 including the variable nozzle device 1 will be described.

In the embodiments depicted in FIGS. 1 to 9, the variable-geometry type exhaust turbocharger 2 includes a turbine housing 22 that accommodates a turbine rotor 21 as depicted in FIG. 1, a bearing housing 24 that accommodates a bearing 23 rotatably supporting the rotational shaft 21a of the turbine rotor 21, and a variable nozzle device 1 mounted to an inside of the turbine housing 22 and the bearing housing 24 assembled together. The turbine housing 22 and the bearing housing 24 are fastened with each other by a fastening means such as bolts, while the outer peripheral edge portion of the first plate portion 11a of the nozzle mount 11 described below is nipped by the turbine housing 22 and the bearing housing 24 from the right and the left as depicted in FIG. 1.

Furthermore, although not depicted, the variable-geometry type exhaust turbocharger 2 further includes a compressor housing positioned opposite to the turbine housing 22 across the bearing housing 24. The compressor housing is coupled to the bearing housing 24, and accommodates a compressor rotor inside thereof. Further, the compressor rotor is coupled to the rotational shaft 21a of the turbine rotor 21, and rotates in conjunction with rotation of the rotational shaft 21a to supercharge air to be supplied to the engine. Furthermore, on the radially outer side of the turbine housing 22, a scroll flow passage 25a is formed, which is an exhaust gas flow passage 25 having a scroll shape. The scroll flow passage 25a is in communication with a non-depicted exhaust manifold, and exhaust gas discharged from the engine flows through the scroll flow passage 25a.

As depicted in FIG. 1, the variable nozzle device 1 is positioned such that the axis 1a of the variable nozzle device 1 is collinear with the axis of the turbine rotor 21, on the outer side of the turbine rotor 21 in the perpendicular direction (top-down direction in FIG. 1) to the axis of the turbine rotor 21 (a line collinear with the axis 1a in FIG. 1). Further, the variable nozzle device 1 forms a nozzle flow passage 25b serving as an exhaust gas flow passage 25, between the scroll flow passage 25a and the turbine rotor 21. The arrow 'f' in FIGS. 1 and 4 indicates a flow direction of exhaust gas. Exhaust gas discharged from the engine passes through the scroll flow passage 25a, and then the nozzle flow passage 25b defined by the variable nozzle device 1, before being supplied to the turbine rotor 21. Further, after being supplied to the turbine rotor 21, the exhaust gas is discharged outside the turbine housing 22 from an exhaust gas outlet 26.

As depicted in FIGS. 1 to 5 and 9, the variable nozzle device 1 includes a nozzle mount 11 (first plate-shaped member), a nozzle plate 12 (second plate-shaped member), at least one nozzle support 13, at least one nozzle vane 14, and a variable nozzle mechanism 15.

The nozzle mount 11 is formed to have an annular and substantially plate shape. More specifically, the nozzle mount 11 includes a first plate portion 11a having an annular shape, as depicted in FIGS. 1, 3, 5, and 9. As depicted in FIGS. 3, 5, and 9, the first plate portion 11a includes a radially inner portion 11c supporting the nozzle vane 14, and a radially outer portion 11b positioned on the radially outer side of the radially inner portion 11c, which are formed integrally. Further, the radially inner portion 11c is formed to have a larger thickness than the radially outer portion 11b.

Further, as depicted in FIGS. 1, 3, 5, and 9, the radially outer portion 11b of the nozzle mount 11 has as many through holes 11f as nozzle supports 13, for engaging with nozzle-mount coupling portions 13a of the nozzle supports 13. The through hole 11f has, at a side of a surface 11e adjacent to the bearing housing 24, an increased diameter portion whose shaft diameter increases gradually toward the surface 11e in the axial direction of the through hole 11f. In a case where a plurality of nozzle supports 13 are provided, a plurality of through holes 11f are disposed at intervals from one another along the circumference, when the surface 11e of the first plate portion 11a is seen from the front.

Further, as depicted in FIGS. 1, 3, 5, and 9, the radially inner portion 11c of the nozzle mount 11 has as many through holes 11g as nozzle vanes 14, for rotatably supporting the nozzle shafts 14a of the nozzle vanes 14. In a case where a plurality of nozzle vanes 14 are provided, a plurality of through holes 11g are disposed at intervals from one another along the circumference, when the surface 11e of the first plate portion 11a is seen from the front.

As depicted in FIG. 1, the nozzle mount 11 is fixed to the bearing housing 24 by fastening the turbine housing 22 and the bearing housing 24 by a fastening means such as bolts, while the outer peripheral edge portion of the first plate portion 11a is nipped between the turbine housing 22 and the bearing housing 24. Thus, the variable nozzle device 1 including the nozzle mount 11 is also fixed to the bearing housing 24. Further, the surface 11e of the first plate portion 11a of the nozzle mount 11 and an annular groove portion formed on the bearing housing 24 define an internal space 24a inside thereof. Furthermore, as depicted in FIG. 1, a back plate 27 having an annular shape is disposed between an edge portion on the radially inner side of the nozzle mount 11 and the bearing housing 24.

The nozzle plate 12 is formed to have an annular and substantially plate shape. More specifically, as depicted in FIGS. 1, 3, 5, and 9, the nozzle plate 12 includes a second plate portion 12a having an annular and plate shape, and an extension portion 12e extending opposite from the nozzle mount 11 (to the right in FIG. 1) from the inner peripheral edge portion of the second plate portion 12a so as to be along the outer peripheral shape of the turbine rotor 21, which are formed integrally. Furthermore, as depicted in FIGS. 1, 3, 5, and 9, the second plate portion 12a of the nozzle plate 12 has as many through holes 12d as nozzle supports 13, for engaging with nozzle-mount coupling portions 13b of the nozzle supports 13. The through holes 12d are arranged so as to correspond to the respective through holes 11f of the nozzle mount 11. Each through hole 12d has, at a side of a surface 12c opposite to the nozzle mount 11, an increased diameter portion whose shaft diameter increases gradually toward the surface 12c in the axial direction of the through hole 12d.

As depicted in FIGS. 1, 3, 5, and 9, the nozzle plate 12 is positioned such that the facing surface 12b of the second plate portion 12a faces the facing surface 11d of the first plate portion 11a of the nozzle mount 11, and is supported by the nozzle support 13 at a distance from the nozzle mount 11. Thus, as depicted in FIG. 1, a nozzle flow passage 25b is defined between the first plate portion 11a of the nozzle mount 11 and the second plate portion 12a of the nozzle plate 12. Furthermore, as depicted in FIG. 1, the nozzle plate 12 is positioned such that at least a part of the surface 12c opposite to the facing surface 12b of the second plate portion 12a faces the above described scroll flow passage 25a. More specifically, the nozzle plate 12 is positioned such that more than a half of the length dimension, with respect to the radial direction of the nozzle plate 12 (right-left direction in FIG. 1), of the surface 12c at the opposite side faces the scroll flow passage 25a.

As depicted in FIGS. 1, 3, 5, 6, 7, and 9, the nozzle support 13 includes a nozzle-mount coupling portion 13a coupled to the first plate portion 11a of the nozzle mount 11, a nozzle-plate coupling portion 13b coupled to the second plate portion 12a of the nozzle plate 12, and a body portion 13c disposed between the nozzle-mount coupling portion 13a and the nozzle-plate coupling portion 13b continuously from the nozzle-mount coupling portion 13a and the nozzle-plate coupling portion 13b, which are formed integrally.

As depicted in FIGS. 6 and 7, the nozzle-mount coupling portion 13a of the nozzle support 13 includes a first small-diameter portion 13d, disposed on the side of the body portion 13c, having a cylindrical shape and extending in the axial direction of the nozzle support 13, and a first diameter-increasing portion 13e disposed continuously from the first small-diameter portion 13d and formed to have a shaft diameter which increases gradually with distance from the first small-diameter portion 13d in the axial direction, which are formed integrally. Furthermore, as depicted in FIGS. 6 and 7, the nozzle-plate coupling portion 13b of the nozzle support 13 includes a second small-diameter portion 13f, disposed on the side of the body portion 13c, having a cylindrical shape and extending in the axial direction of the nozzle support 13, and a second diameter-increasing portion 13g disposed continuously from the second small-diameter portion 13f and formed to have a shaft diameter which increases gradually with distance from the second small-diameter portion 13f in the axial direction, which are formed integrally.

Furthermore, as depicted in FIGS. 1, 3, 5, and 9, the nozzle-mount coupling portion 13a disposed on an end with respect to the axial direction of the nozzle support 13 is coupled with the first plate portion 11a, as the first small-diameter portion 13d and the first diameter-increasing portion 13e are engaged with the through hole 11f formed on the first plate portion 11a of the nozzle mount 11. Furthermore, as depicted in FIGS. 1, 3, 5, and 9, the nozzle-plate coupling portion 13b disposed on another end with respect to the axial direction of the nozzle support 13 is coupled with the second plate portion 12a, as the second small-diameter portion 13f and the second diameter-increasing portion 13g are engaged with the through hole 12d formed on the second plate portion 12a of the nozzle plate 12.

Further, at least one of the first diameter-increasing portion 13e of the nozzle-mount coupling portion 13a or the second diameter-increasing portion 13g of the nozzle-plate coupling portion 13b may be formed when being coupled to the nozzle mount 11 and the nozzle plate 12, and may not necessarily be formed before the coupling.

In some embodiments, as depicted in FIGS. 1 and 3, the body portion 13c of the nozzle support 13 is formed so as to have a shaft diameter that is larger than the first small-diameter portion 13d of the nozzle-mount coupling portion 13a and the second small-diameter portion 13f of the nozzle-plate coupling portion 13b, over the entire range in the axial direction of the body portion 13c, and is also formed to have a cylindrical shape that extends in the axial direction of the body portion 13c.

Further, in some other embodiments, as depicted in FIGS. 5, 6, 7, and 9, the body portion 13c of the nozzle support 13 includes a first large-diameter portion 13h which is formed to have a cylindrical shape extending in the axial direction at the side of the nozzle-mount coupling portion 13a, a second large-diameter portion 13i formed to have a cylindrical shape extending in the axial direction at the side of the nozzle-plate coupling portion 13b, and a third small-diameter portion 13j disposed between the first large-diameter portion 13h and the second large-diameter portion 13i continuously from the first large-diameter portion 13h and the second large-diameter portion 13i, which are formed integrally. Further, the first large-diameter portion 13h is formed to have a larger diameter than the first small-diameter portion 13d of the nozzle-mount coupling portion 13a. Further, the second large-diameter portion 13i is formed to have a larger diameter than the second small-diameter portion 13f of the nozzle-plate coupling portion 13b. Further, the third small-diameter portion 13j is formed to have a minimum diameter that is smaller than the first large-diameter portion 13h and the second large-diameter portion 13i.

As depicted in FIGS. 1, 3, 5, and 9, the nozzle vane 14 has a nozzle shaft 14a which is inserted through the through hole 11f of the nozzle mount 11 and which is supported rotatably. Furthermore, as depicted in FIGS. 1, 3, 5, and 9, the nozzle vane 14 has a tip portion 14b disposed between the nozzle mount 11 and the nozzle plate 12, and a gap is formed between the tip portion 14b and the nozzle plate 12.

As depicted in FIGS. 1 to 3, 5, and 9, the variable nozzle mechanism 15 includes at least one lever plate 16 and a drive ring 17. The variable nozzle mechanism 15 is positioned inside the internal space 24a. As many lever plates 16 as the nozzle vanes 14 are provided. In a case where a plurality of lever plates 16 are provided, the lever plates 16 are disposed at intervals along the circumference as depicted in FIG. 2. Furthermore, the lever plate 16 has an end coupled to a protruding portion of the nozzle shaft 14a protruding into the internal space 24a, and another end coupled to the drive ring 17. Further, the drive ring 17 is formed to have an annular and plate shape, and is positioned such that the inner peripheral surface of the drive ring 17 faces a stepped surface formed between the radially outer portion 11b and the radially inner portion 11c of the nozzle mount 11. Furthermore, the drive ring 17 is disposed so as to be rotatable relative to the nozzle mount 11.

Thus, the variable nozzle mechanism 15 is capable of changing the vane angle of the nozzle vane 14 by rotating the drive ring 17 a predetermined angle so that the lever plate 16 operates in conjunction with the drive ring 17. Furthermore, the variable nozzle device 1 is capable of increasing and decreasing the flow-passage area of exhaust gas supplied to the turbine rotor 21 by changing the vane angle of the nozzle vanes 14. Accordingly, it is possible to adjust the flow velocity of exhaust gas supplied to the turbine rotor 21 and the supply amount to the turbine rotor 21, to adjust the boost pressure of air supplied to the engine.

The variable nozzle mechanism 15 is not limited only to the above described embodiment, and it is sufficient if the variable nozzle mechanism 15 is capable of changing the vane angle of the nozzle vane 14.

Next, described with reference to the drawings of the present invention is an example of performance deterioration of the variable nozzle device due to thermal deformation of various parts of the variable nozzle device.

In a typical variable nozzle device, for instance, as depicted in FIG. 4, exhaust gas causes thermal deformation of the nozzle mount 11 and the nozzle plate 12 formed of stainless steel, for instance. At this time, thermal energy from exhaust gas is different, and thus the amount of thermal deformation is different accordingly, between the nozzle mount 11, which is fixed to the bearing housing 24 and which comes into contact with high-temperature exhaust gas passing through the nozzle flow passage 25b only at the facing surface 11d facing the nozzle plate 12, where heat transfers to the bearing housing 24 having a lower temperature, and the nozzle plate 12, which comes into contact with high-temperature exhaust gas passing through the nozzle flow passage 25b at the facing surface 12b facing the nozzle mount 11 and which comes into contact with high-temperature exhaust gas passing through the scroll flow passage 25a at the surface 12c opposite to the facing surface 12b. Further, in the variable nozzle device 1, due to the difference in the amount of thermal deformation between the nozzle mount 11 and the nozzle plate 12, the second plate portion 12a coupled to the nozzle support 13 in the nozzle plate 12 deforms like wave, whereby a shear force and bending moment are applied to the nozzle mount 11, the nozzle plate 12, and the nozzle support 13 coupling the nozzle mount 11 and the nozzle plate 12. Accordingly, a shear load and a bending load are applied to the through hole 12d of the nozzle plate 12 engaged with the nozzle-plate coupling portion 13b of the nozzle support 13, the nozzle-mount coupling portion 13a, and the nozzle-plate coupling portion 13b of the nozzle support 13, which may cause damage to the nozzle plate 12 or the nozzle support 13. If the nozzle plate 12 or the nozzle support 13 is damaged, the performance of the variable nozzle device 1 deteriorates.

Some embodiments described below are to prevent damage to the nozzle plate 12 and the nozzle support 13.

In some embodiments, as depicted in FIGS. 1, 2, 3, 5, and 9, the variable nozzle device 1 includes the nozzle mount 11 described above, the nozzle plate 12 described above, the at least one nozzle support 13 described above, the at least one nozzle vane 14 described above, and the variable nozzle mechanism 15 described above. Furthermore, as depicted in FIGS. 3 and 9, in the variable nozzle device 1, the second plate portion 12a of the nozzle plate 12 is formed to have a larger thickness than the first plate portion 11a of the nozzle mount 11. That is, the thickness dimension T1 of the second plate portion 12a of the nozzle plate 12 is larger than the thickness dimension T2 of the first plate portion 11a of the nozzle mount 11.

With the above configuration, the nozzle plate 12 is configured such that the facing surface 12b of the second plate portion 12a facing the first plate portion 11a of the nozzle mount 11 makes contact with high-temperature exhaust gas passing through the nozzle flow passage 25b, and at least a part of the surface 12c of the second plate portion 12a makes contact with high-temperature exhaust gas passing through the scroll flow passage 25a formed inside the turbine housing 22. By forming the second plate portion 12a of the nozzle plate 12 to have a larger thickness than the first plate portion 11a of the nozzle mount 11, it is possible to increase the heat capacity of the second plate portion 12a, and increase the strength of the second plate portion 12a. Further, with the second plate portion 12a having a high heat capacity and a high strength, it is possible to prevent wavy deformation of the second plate portion 12a, and reduce the amount of thermal deformation of the second plate portion 12a due to exhaust gas. By reducing the amount of thermal deformation of the second plate portion 12a due to exhaust gas, it is possible to reduce the shearing force and the bending moment applied to the nozzle support 13 coupled to the second plate portion 12a. Accordingly, it is possible to prevent damage to the nozzle plate 12 and the nozzle support 13, and prevent performance deterioration and malfunction of the variable nozzle device 1. Furthermore, it is possible to use stainless steel to form parts of the variable nozzle device 1 such as the nozzle mount 11 and the nozzle plate 12, instead of an expensive heat-resistant alloy. Thus, it is possible to reduce the costs to produce the variable nozzle device 1.

Thus, with the above configuration, it is possible to prevent performance deterioration and malfunction of the variable nozzle device 1 due to thermal deformation of various parts used in the variable nozzle device 1 under a high temperature.

Furthermore, in some embodiments, as depicted in FIGS. 3 and 9, in the variable nozzle device 1, the thickness-dimension ratio T1/T2 is 1.3-1.8, where T1 is the thickness dimension of the second plate portion 12a of the nozzle plate 12 and T2 is the thickness dimension of the first plate portion 11a of the nozzle mount 11.

With the above configuration, in the variable nozzle device 1, the thickness-dimension ratio T1/T2 is 1.3-1.8, where T1 is the thickness dimension of the second plate portion 12a and T2 is the thickness dimension of the first plate portion 11a. Herein, if the thickness-dimension ratio T1/T2 of the second plate portion 12a to the first plate portion 11a is smaller than 1.3, it may be difficult to reduce the amount of thermal deformation of the second plate portion 12a under a high temperature, because the second plate portion 12a has a small thickness. Further, if the thickness-dimension ratio T1/T2 of the second plate portion 12a to the first plate portion 11a is greater than 1.8, it may increase the weight and the price of the nozzle plate 12 having the second plate portion 12a, because the second plate portion 12a has a large thickness. In this regard, in a case where the thickness-dimension ratio T1/T2 of the second plate portion 12a to the first plate portion 11a is 1.3-1.8, it is possible to reduce the amount of thermal deformation of the second plate portion 12a under a high temperature, and to prevent an increase in the weight and the price of the nozzle plate 12 having the second plate portion 12a.

Furthermore, in some embodiments, as depicted in FIG. 9, in the variable nozzle device 1, the second plate portion 12a of the nozzle plate 12 is formed to have a larger thickness than the radially inner portion 11c of the nozzle mount 11. That is, as depicted in FIG. 9, the thickness dimension T1 of the second plate portion 12a of the nozzle plate 12 is larger than the thickness dimension T3 of the radially inner portion 11c of the nozzle mount 11. In this case, with the second plate portion 12a of the nozzle plate 12 formed to have a larger thickness than the radially inner portion of the first plate portion 11a of the nozzle mount 11, it is possible to increase the heat capacity of the second plate portion 12a, and increase the strength of the second plate portion 12a.

Next, described with reference to the drawings of the present invention is another example of performance deterioration of the variable nozzle device due to thermal deformation of various parts of the variable nozzle device.

A typical variable nozzle device causes malfunction at the time of excessive heating, which is the beginning of operation of the variable nozzle device. The present inventors searched into the cause of malfunction, and found that the cause is the difference in the temperature increase speed between the nozzle support 13 and the nozzle vane 14 at the time of excessive heating. As depicted in FIGS. 3, 5, and 9, the nozzle vane 14 is disposed to have a gap from the nozzle plate 12 so that the nozzle vane 14 rotates smoothly. If the gap is large, exhaust gas passes through the gap, which causes performance deterioration of the variable nozzle device. Thus, the gap between the nozzle vane 14 and the nozzle plate 12 is formed to be as small as possible. The nozzle vane 14 having received thermal energy of exhaust gas has a higher temperature increasing speed than the nozzle support 13 having received thermal energy of exhaust gas, and thus obtains a high temperature first and extends in the right-left direction in FIG. 1 so as to increase its own length dimension. Although the nozzle support 13 also extends in the right-left direction in FIG. 1 so as to increase its length dimension, the amount of thermal expansion is different from that of the nozzle vane 14. Thus, at the time of excessive heating, the gap between the nozzle vane 14 and the nozzle plate 12 may decrease, or the tip of the nozzle vane 14 makes contact the nozzle plate 12, which hinders rotation of the nozzle vane 14, causing malfunction of the variable nozzle device 1.

Some embodiments described below are to prevent malfunction of the variable nozzle device 1 at the time of excessive heating.

In some embodiments, as depicted in FIGS. 1, 2, 3, 5, and 9, the variable nozzle device 1 includes the nozzle mount 11 described above, the nozzle plate 12 described above, the at least one nozzle support 13 described above, the at least one nozzle vane 14 described above, and the variable nozzle mechanism 15 described above. Furthermore, as depicted in FIGS. 5 and 9, the nozzle support 13 includes, at the center part with respect to the axial direction of the body portion 13c positioned between the nozzle mount 11 and the nozzle plate 12, a third small-diameter portion 13j having a smaller shaft diameter than both end portions (the first large-diameter portion 13h and the second large-diameter portion 13i) of the body portion 13c. That is, the body portion of the nozzle support includes the third small-diameter portion 13j at the center part, and the first large-diameter portion 13h and the second large-diameter portion 13i having a greater diameter than the third small-diameter portion 13j at both end portions.

Herein, each of the samples 31 to 35 in FIG. 8 is the above described nozzle support 13 having the first large-diameter portion 13h, the second large-diameter portion 13i, and the third small-diameter portion 13j. Furthermore, the sample 31 in FIG. 8 is a nozzle support 13 including the third small-diameter portion 13j formed to have a cylindrical shape, and each of the samples 32 to 35 in FIG. 8 is a nozzle support 13 having a curved narrowed portion 13k at the third small-diameter portion 13j. The present inventors carried out unsteady conduction analysis with each of the samples 31 to 35, and confirmed that the temperature-increase speed is improved compared to the nozzle support 13 whose body portion 13c has a cylindrical shape. Further, it is confirmed that each of the samples 32 to 34 has an improved temperature increase speed compared to the sample 31.

With the above configuration, with the body portion 13*c* of the nozzle support 13 having the first large-diameter portion 13*h* and the second large-diameter portion 13*i* at both end portions, it is possible to prevent reduction of the bend strength of the nozzle support 13. Furthermore, with the body portion 13*c* of the nozzle support 13 having the third small-diameter portion 13*j* at the center part, it is possible to reduce the heat capacity of the nozzle support 13, and raise the temperature-increase speed of the nozzle support 13 under a high temperature. Furthermore, by raising the temperature-increase speed of the nozzle support 13 under a high temperature, it is possible to reduce the difference in the amount of thermal expansion between the nozzle support 13 and the nozzle vane 14 at the time of excessive heating, and thereby prevent malfunction of the variable nozzle device 1 due to a narrowed gap between the nozzle vane 14 and the nozzle plate 12, or contact between the nozzle vane 14 and the nozzle plate 12.

Thus, with the above configuration, it is possible to prevent performance deterioration and malfunction of the variable nozzle device 1 due to thermal deformation of various parts used in the variable nozzle device 1 under a high temperature.

Some of the above described embodiments may be combined upon implementation to obtain another embodiment. For instance, as depicted in FIG. 9, in the variable nozzle device 1, the second plate portion 12*a* of the nozzle plate 12 may be formed to have a larger thickness than the first plate portion 11*a* of the nozzle mount 11, and the nozzle support 13 may have the first large-diameter portion 13*h*, the second large-diameter portion 13*i*, and the third small-diameter portion 13*j* at the body portion 13*c*. In this case, it is possible to prevent damage to the nozzle plate 12 and the nozzle support 13, and prevent malfunction of the variable nozzle device 1.

Furthermore, in some embodiments described above, the materials of the nozzle support 13 and the nozzle vane 14 are not particularly mentioned. The nozzle support 13 should be preferably formed of a material having a larger coefficient of linear expansion than the nozzle vane 14. In this way, it is possible to reduce the difference in the amount of thermal expansion between the nozzle support 13 and the nozzle vane 14 at the time of excessive heating.

Furthermore, in some embodiments, as depicted in FIG. 9, the curved narrowed portion 13*k* is formed on the third small-diameter portion 13*j* of the nozzle support 13. More specifically, the third small-diameter portion 13*j* of the nozzle support 13 is formed to have a shaft diameter which increases from the center toward both end portions with respect to the axial direction. In this case, the third small-diameter portion 13*j* is formed to have a shaft diameter which increases from the center toward both end portions with respect to the axial direction. Thus, it is possible to prevent a decrease in the bend strength of the nozzle support 13 and reduce the shaft diameter of the third small-diameter portion 13*j* of the nozzle support 13, compared to a case where the center part with respect to the axial direction is formed to have a cylindrical shape. Thus, it is possible to further reduce the heat capacity of the nozzle support 13.

Further, the nozzle support 13 should preferably be formed such that no stepped surface is formed between the curved narrowed portion 13*k* and the first large-diameter portion 13*h*, and between the curved narrowed portion 13*k* and the second large-diameter portion 13*i*. This is because, in a case where a stepped surface is formed, stress may concentrate locally at the connection portion between the curved 13*k* and the first large-diameter portion 13*h* or the second large-diameter portion 13*i*.

Further, in some other embodiments, the nozzle support 13 includes the first large-diameter portion 13*h* described above, the second large-diameter portion 13*i* described above, and the third small-diameter portion 13*j* described above. Further, the nozzle support 13 is configured such that the shaft diameter ratio D3/D2 is 0.6-0.9, where D3 is the minimum diameter of the third small-diameter portion 13*j* and D2 is the diameter of the second large-diameter portion 13*i*. Herein, in a case where the shaft diameter ratio D3/D2 of the nozzle support 13 is smaller than 0.6, it may be difficult to prevent reduction of the bend strength of the nozzle support 13. Further, in a case where the shaft diameter ratio D3/D2 of the nozzle support 13 is larger than 0.9, it may be difficult to reduce the heat capacity of the nozzle support 13 so as to raise the temperature increase speed of the nozzle support 13 under a high temperature. In this regard, in a case where the shaft diameter ratio D3/D2 of the nozzle support 13 is 0.6-0.9, it is possible to reduce the heat capacity of the nozzle support 13 while preventing a decrease in the bend strength of the nozzle support 13.

Further, in some other embodiments, the nozzle support 13 includes the first large-diameter portion 13*h* described above, the second large-diameter portion 13*i* described above, and the third small-diameter portion 13*j* described above. Furthermore, the nozzle support 13 is configured such that the length dimension ratio H/L is 0.1-0.3, where H is the length dimension of the second large-diameter portion 13*i* with respect to the axial direction, and L is the total length dimension of the first large-diameter portion 13*h*, the second large-diameter portion 13*i*, and the third small-diameter portion 13*j* with respect to the axial direction (length dimension in the axial direction of the body portion 13*c*). Herein, in a case where the length dimension ratio H/L of the nozzle support 13 is smaller than 0.1, it may be difficult to prevent reduction of the bend strength of the nozzle support 13. Furthermore, in a case where the length dimension ratio H/L of the nozzle support 13 is larger than 0.3, it may be difficult to reduce the heat capacity of the nozzle support 13 so as to raise the temperature increase speed of the nozzle support 13 under a high temperature. In this regard, in a case where the length dimension ratio H/L of the nozzle support 13 is 0.1-0.3, it is possible to reduce the heat capacity of the nozzle support 13 while preventing a decrease in the bend strength of the nozzle support 13.

Further, in some other embodiments, the nozzle support 13 includes the first large-diameter portion 13*h* described above, the second large-diameter portion 13*i* described above, the third small-diameter portion 13*j* described above, and the second small-diameter portion 13*f* described above. Further, the nozzle support 13 is configured such that the shaft diameter ratio D1/D2 is 0.6-0.8, where D1 is the shaft diameter of the second small-diameter portion 13*f* and D2 is the shaft diameter of the second large-diameter portion 13*i*. Herein, in a case where the shaft diameter ratio D1/D2 of the nozzle support 13 is smaller than 0.6, it may be difficult to reduce the heat capacity of the nozzle support 13 so as to raise the temperature increase speed of the nozzle support 13 under a high temperature. Furthermore, in a case where the shaft diameter ratio D1/D2 of the nozzle support 13 is larger than 0.8, it may be difficult to prevent reduction of the bend strength of the nozzle support 13. In this regard, in a case where the shaft diameter ratio D1/D2 of the nozzle support 13 is 0.6-0.8, it is possible to reduce the heat capacity of the nozzle support 13 while preventing a decrease in the bend strength of the nozzle support 13.

Further, in some other embodiments, the variable-geometry type exhaust turbocharger 2 includes the variable nozzle device 1 having the configuration described in any one of the above embodiments (see FIGS. 1 to 9).

With the above configuration, the variable-geometry type exhaust turbocharger 2 includes the variable nozzle device 1 having the configuration described in any one of the above embodiments (see FIGS. 1 to 9), and thus it is possible to prevent performance deterioration and malfunction of the variable nozzle device 1 due to thermal deformation of various parts used in the variable nozzle device 1 under a high temperature. Thus, with the variable-geometry type exhaust turbocharger 2, the performance of the variable nozzle device 1 is maintained under a high temperature, and thus it is possible to adjust the boost pressure of air supplied to the engine under a high temperature.

Embodiments of the present invention were described in detail above, but the present invention is not limited thereto, and various amendments and modifications may be implemented.

REFERENCE SIGNS LIST

1 Variable nozzle device
1*a* Axis
11 Nozzle mount
11*a* First plate portion
11*b* Radially outer portion
11*c* Radially inner portion
11*d* Facing surface
11*e* Surface
11*f*, 11*g* Through hole
12 Nozzle plate
12*a* Second plate portion
12*b* Facing surface
12*c* Surface
12*d* Through hole
12*e* Extension portion
13 Nozzle support
13*a* Nozzle-mount coupling portion
13*b* Nozzle-plate coupling portion
13*c* Body portion
13*d* First small-diameter portion
13*e* first diameter-increasing portion
13*f* Second small-diameter portion
13*g* Second diameter-increasing portion
13*h* First large-diameter portion
13*i* Second large-diameter portion
13*j* Third small-diameter portion
13*k* Curved narrowed portion
14 Nozzle vane
14*a* Nozzle shaft
15 Variable nozzle mechanism
16 Lever plate
17 Drive ring
2 Variable-geometry type exhaust turbocharger
21 Turbine rotor
21*a* Rotational shaft
22 Turbine housing
23 Bearing
24 Bearing housing
24*a* Internal space
25 Exhaust gas flow passage
25*a* Scroll flow passage
25*b* Nozzle flow passage
26 Exhaust gas outlet
27 Back plate
31-35 Sample
D1 Shaft diameter of the second small-diameter portion
D2 Shaft diameter of the second large-diameter portion
D3 Shaft diameter of the third small-diameter portion
H, L Length dimension
T1, T2, T3 Thickness dimension

The invention claimed is:

1. A variable nozzle device, comprising:
a first plate-shaped member having a first plate portion having an annular shape and being fixed to a bearing housing;
a second plate-shaped member having a second plate portion which has an annular shape and which defines a nozzle flow passage between the first plate portion and the second plate portion, the second plate portion having a surface disposed so as to face the first plate portion and another surface disposed so as to face at least partially a scroll flow passage formed inside a turbine housing;
at least one nozzle support having, with respect to an axial direction of the nozzle support, an end coupled to the first plate portion and another end coupled to the second plate portion;
at least one nozzle vane rotatably supported between the first plate portion and the second plate portion; and
a variable nozzle mechanism configured to change a vane angle of the at least one nozzle vane, the variable nozzle mechanism including a drive ring disposed so as to rotatable relative to the first plate-shaped member and at least one lever plate which has an end coupled to a nozzle shaft of the nozzle vane and another end coupled to the drive ring,
wherein the second plate portion is formed to have a larger thickness than the first plate portion,
wherein the first plate portion includes a radially inner portion supporting the nozzle vane and a radially outer portion positioned on a radially outer side of the radially inner portion,
wherein the radially inner portion is formed to have a larger thickness than the radially outer portion,
wherein the second plate portion is formed to have a larger thickness than the radially inner portion of the first plate portion, and
wherein the nozzle support includes a body portion positioned between the first plate-shaped member and the second plate-shaped member, the body portion having a small diameter portion which is formed in a center part with respect to the axial direction and which has two end portions and a smaller shaft diameter than both end portions of the body portion.

2. The variable nozzle device according to claim 1, wherein a thickness dimension ratio T1/T2 is 1.3-1.8, where T1 is a thickness dimension of the second plate portion and T2 is a thickness dimension of the first plate portion.

3. The variable nozzle device according to claim 1, wherein the small diameter portion is formed to have a shaft diameter that increases from a side of the center part towards sides of both end portions in the axial direction.

4. The variable nozzle device according to claim 1, wherein the nozzle support includes a second plate-shaped member side large diameter portion disposed continuously from the small diameter portion at a side of the second plate-shaped member, and formed to have a larger diameter than a second plate-shaped member side coupling portion coupled to the second plate-shaped member, and wherein a shaft diameter ratio $D3/D2$ is 0.6-0.9, where $D3$ is a minimum diameter of the small diameter portion and $D2$ is a diameter of the second plate-shaped member side large diameter portion.

5. The variable nozzle device according to claim 4, wherein the nozzle support includes a first plate-shaped member side large diameter portion disposed continuously from the small diameter portion at a side of the first plate-shaped member, and formed to have a larger diameter than a first plate-shaped member side coupling portion coupled to the first plate-shaped member, wherein a length dimension ratio $H/L$ is 0.1-0.3, where $H$ is a length dimension of the second plate-shaped member side large diameter portion in the axial direction and $L$ is a total length dimension of the first plate-shaped member side large diameter portion, the second plate-shaped member side large diameter portion, and the small diameter portion in the axial direction, and wherein a shaft diameter ratio $D1/D2$ is 0.6-0.8, where $D1$ is a diameter of the second plate-shaped member side coupling portion.

6. A variable-geometry type exhaust turbocharger, comprising the variable nozzle device according to claim 1.

\* \* \* \* \*